(No Model.)
J. C. PENNINGTON.
METHOD OF STERILIZING VESSELS.
No. 559,203. Patented Apr. 28, 1896.
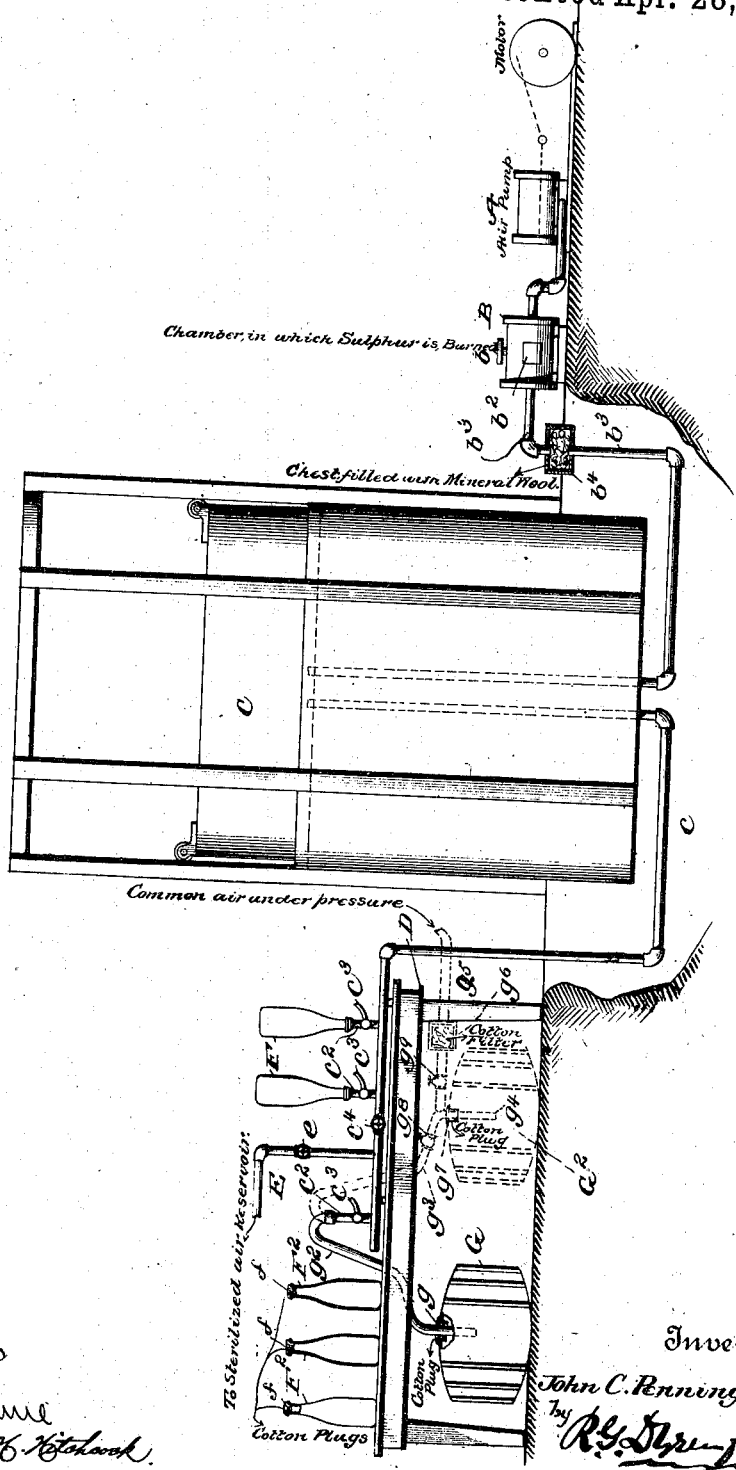
Witnesses
Inventor
John C. Pennington.
by R. G. Dyrenforth,
his Attorney

UNITED STATES PATENT OFFICE.

JOHN C. PENNINGTON, OF PATERSON, NEW JERSEY.

METHOD OF STERILIZING VESSELS.

SPECIFICATION forming part of Letters Patent No. 559,203, dated April 28, 1896.

Application filed June 19, 1893. Serial No. 478,136. (No specimens.)

*To all whom it may concern:*

Be it known that I, JOHN C. PENNINGTON, a citizen of the United States, and a resident of Paterson, in the county of Passaic and State of New Jersey, have invented certain new and useful Improvements in Methods of Sterilizing Vessels, of which the following is a specification.

This invention relates to sterilizing.

The object is, in a ready and at once thoroughly-effective manner, to free vessels from living spores and germs for use in receiving and in containing substances liable to fermentation or decay, particularly for use in receiving and keeping germ-free, spurious-ferment free, or previously-sterilized substances, such as a pure beer made with pedigree yeast or a sterilized wort.

The invention resides in the method of sterilizing, which consists in introducing into a vessel a germicidal gas, retained a sufficient length of time to kill all contained spores and germs, and then, without exhaustion of the gas, permitting or causing its replacement with spore and germ free or pure air under exclusion of other air by natural diffusion with or expulsion by spore and germ free air.

In the accompanying drawing, forming part of this specification, I have illustrated some of many forms in which my invention may be carried into effect.

In the usual practice of my invention I introduce into the vessel or vessels to be sterilized a proper quantity of sulfurous acid gas, then apply a plug of cotton-wool to the vessel mouth or mouths, (or I have the plug in the opening into the vessel with the nozzle by which the gas is introduced passing through or penetrating the plug,) and then cause germ-free or sterilized air to replace the gas, either passively and naturally by permitting natural diffusion of gas and air by interpassage alone through the filter for about twelve hours or until the vessel is wanted for use, whereby the air will be filtered and freed from all spores and germs in entering the vessel, and the whole of the gas will be displaced, or actively by injecting, after the lapse of a suitable but short time, previously-sterilized air into the vessel under exclusion of other air, pushing the gas out through the filter and rendering the vessel immediately ready for its use. This procedure—*i. e.*, replacement—as will be apparent from the method and apparatus shown, may begin simultaneously with the exhibition or admission of the germicidal gas or subsequent thereto. It will generally, by adaptation of the apparatus, begin at once.

I have discovered that by the above-described method of passive and natural diffusion the gas will remain in a vessel long enough to kill all spores and germs and entirely escape, leaving the vessel completely free from gas and filled with sterilized air and thus ready for use without further treatment, it being immediately fit and ready to receive and contain beer, wine, or other fermentable liquid, or other substance, without imparting to the same any unpleasant taste or injurious property.

In sterilizing small vessels, such as bottles, I prefer to introduce the gas first, then insert the plug into the mouth, and then allow the operation to proceed by natural diffusion through the plug; while in sterilizing large vessels, such as casks and barrels, I prefer to insert the plug first, then introduce the gas by passing the nozzles of the gas-pipe through the plug into the vessel, or by inserting the nozzle into the vessel with the plug closely surrounding it at and fitting the opening into the same, and having introduced a sufficient quantity of the gas, stopped the flow and left the gas in the vessel a proper length of time, there to exert its effect, (as by introducing gas into a number of casks in succession, closing the hole in the plug in each cask as the gas-nozzle is withdrawn, and leaving them a proper time,) blow sterilized air through the same or another pipe and through the nozzle, displacing the gas by pushing it out through the plug, this plug permitting egress of the gas while also arresting access to the interior of the vessel of dust and spores and germs.

At any suitable time air may be introduced into the cask in or from a spore and germ free room properly provided with means to keep it so. The injection of sterilized air may be continued until all the gas has been displaced, whereupon the vessel will be in condition for immediate use either for filling it through the nozzle, (disconnected from the sterilized-air supply and connected then with a proper source,) or having withdrawn the nozzle and closed the hole in the plug through which it was entered for filling otherwise, care always being observed in introducing into a sterilized vessel the substance which it is to contain and keep to prevent intrusion of living spores or germs.

In any operation under my procedure the quantity of germicidal gas employed need not exceed five per cent. of the capacity of the vessel treated. In some cases the quantity may be much less.

My invention is not to be confounded with a method of sterilizing in which a germicidal gas is introduced into the vessel and then pumped out, leaving the vessel exhausted of aeriform fluid, whereby thereafter spore and germ free air enters the vessels; a great point of merit of my invention being that by my procedure the necessity of such exhaustion, with the difficulties incident thereto, are avoided, the gas being removed by the air which is to replace it and which takes its place immediately.

In the drawing, A designates an air-pump driven by a suitable motor, and B a chamber in which sulfur is burned by the aid of the air forced in by the pump, after the sulfur is once ignited there being no need of any heat other than that supplied by the burning sulfur. At the top of the chamber B is a tight-fitting removable cover or plug $b$, where the sulfur is introduced and then ignited, as by red-hot iron. Near the bottom of the chamber is a door or manhole $b^2$ to give access to the chamber to clean it.

The chamber B communicates by a pipe $b^3$, provided in its course with a small chest $b^4$, filled with mineral wool to trap dust and any sublimate sulfur, with a gasometer C, the upper part of which is of sheet-lead properly braced, and the lower part preferably a wooden vessel lined with lead and from which leads a pipe $c$. The usual water in the lower part of the gasometer may be covered with a layer of oil to prevent absorption of gas by the water, though this is not absolutely essential, as the loss of gas by absorption is small without the addition of oil. The pipe $c$ leads to and rests upon a table D, and is provided with nozzles $c^2$, having spring stop-cocks $c^3$. Between the farther two nozzles the pipe $c$ may be provided also with an ordinary cock or valve $c^4$, and entering the pipe beyond the valve there may be a pipe E, leading from any suitable source or supply of sterilized air, and having a valve $e$. Upon some of the nozzles are shown bottles F, ready to be or in course of being charged with gas, while beyond the nozzles are shown bottles $F^2$, which have been charged with gas and have their mouths provided with plugs of cotton-wool or asbestos $f$. Below the table is shown a cask G, having its bung provided with a plug, of cotton-wool or asbestos $g$, there being a suitable pipe $g^2$ leading from the farther nozzle $c^2$ and entering the cask through the plug in its bung.

A mixture of air and sulfurous-acid gas flows into the gasometer, whence it is drawn as desired at the table, where the bottles and a cask or casks are charged with the mixture, the bottles by applying their mouths to the nozzles, as shown, and touching the appropriate spring stop-cocks for an instant, after which they are stopped with the plug, and a cask by allowing the mixture to flow, for a short time, from the nozzle through the pipe which enters the cask by a nozzle through the cotton plug in its bung, after which sterilized air, under pressure, may enter the cask through the same nozzle and the pipe, either (having waited a proper time for the gas to kill all spores and germs) at once, without withdrawing the nozzle, or after having withdrawn the nozzle and stopped the hole in the plug, displacing the gas through the plug. After the gas has been entirely displaced the pipe is withdrawn and the hole through the plug stopped up.

To cause the gas to flow into the cask G, the valve $e$ being closed, the valve $c^4$ is opened and then the stop-cock $c^3$ in the farther nozzle. To cause sterilized air to flow into the cask, the valve $c^4$ is closed, and the valve $e$ is opened, and then the stop-cock $c^3$ in the farther nozzle.

Instead of forcing sterilized air into a cask through the same pipe as that which conveyed gas to the cask, it may enter the cask from any suitable source through another pipe, or may be sterilized on its way to the cask, as by passage through a cotton filter. Thus below the table is also shown a cask $G^2$ and a pipe $g^3$, similar to or even leading from the pipe $g^2$, and may lead to a nozzle $g^4$, to which also leads a tube $g^5$, provided with a cotton filter $g^6$, the nozzle $g^4$ being entered through a cotton plug $g^7$ in the bung of the cask, as shown. The pipe $g^3$ is preferably provided with means, as at $g^8$, for shutting off, and the tube $g^5$ with means $g^9$.

Under an arrangement of this kind the operation will be apparent. One or more casks having been treated with germicidal gas and sealed against intrusion of ordinary air the flow of gas is stopped, and access of gaseous or aeriform fluid from any other source being arrested, ordinary air, under pressure, is passed by the pipe $g^5$ on its way to the cask through the filter $g^6$, whereby it is freed from spores and germs, and as pure air then enters the cask.

Having thus described my invention and forms of apparatus to illustrate it, what I claim, and desire to secure by Letters Patent, is—

1. The method of sterilizing which consists in introducing into a vessel a germicidal gas and then causing its displacement with pure air by diffusion, expelling the germicidal gas with and replacing it by pure or germ-free air, and retaining this germ-free air in the vessel under exclusion of other air until the pure air is itself displaced by the substance, such as a liquid, with which the vessel eventually is to be filled, all substantially as described.

2. The method of sterilizing, which consists in introducing into a vessel a germicidal gas and then permitting its replacement with pure air by passive diffusion, namely, by natural diffusion through a filter which will permit the escape of the gas and, at once, the admission of air, but effect the exclusion of germs, whereby the gas will exert its action and also be replaced by pure air, substantially as described.

Signed at New York, in the county of New York and State of New York, this 17th day of June, A. D. 1893.

JOHN C. PENNINGTON.

Witnesses:
 B. F. NEISWENDER,
 CHAS. L. ROBINSON.